(12) United States Patent
Nishida et al.

(10) Patent No.: US 10,005,510 B2
(45) Date of Patent: Jun. 26, 2018

(54) SADDLE BAG LOCK DEVICE FOR SADDLE-RIDE TYPE VEHICLE

(71) Applicant: HONDA MOTOR CO., LTD., Tokyo (JP)

(72) Inventors: Yoichi Nishida, Wako (JP); Masashi Tada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 744 days.

(21) Appl. No.: 14/589,208

(22) Filed: Jan. 5, 2015

(65) Prior Publication Data
US 2015/0191946 A1 Jul. 9, 2015

(30) Foreign Application Priority Data
Jan. 7, 2014 (JP) .................. 2014-000869

(51) Int. Cl.
*E05C 3/00* (2006.01)
*B62J 9/00* (2006.01)
(Continued)

(52) U.S. Cl.
CPC .............. *B62J 9/006* (2013.01); *B62H 5/006* (2013.01); *E05B 63/14* (2013.01); *E05B 83/16* (2013.01);
(Continued)

(58) Field of Classification Search
CPC ............ Y10T 292/08; Y10T 292/0801; Y10T 292/081; Y10T 292/0825; Y10T 292/0826; Y10T 292/0828; Y10T 292/0831; Y10T 292/083; Y10T 292/0848; Y10T 292/0849; Y10T 292/0853; Y10T 292/0855; Y10T 292/0857; Y10T 292/0862;
(Continued)

(56) References Cited

U.S. PATENT DOCUMENTS 4,892,338 A * 1/1990 Weinerman ............. E05C 9/046
292/DIG. 31
4,896,906 A * 1/1990 Weinerman ........... E05B 77/265
292/48
(Continued)

FOREIGN PATENT DOCUMENTS

JP 2006-281893 A 10/2006

*Primary Examiner* — Alyson M Merlino
(74) *Attorney, Agent, or Firm* — Birch, Stewart, Kolasch & Birch, LLP

(57) ABSTRACT

In a saddle bag lock device for a saddle-ride type vehicle, in which a bag base body forming a saddle bag together with a lid is provided with multiple catch mechanisms switchable between a locked state where the catch mechanisms are engaged with multiple strikers provided on the lid and an unlocked state where the catch mechanisms are disengaged from the strikers. A switching operation member is manually-operable to synchronously switch the catch mechanisms from the locked state to the unlocked state. The saddle bag is formed to have a mountain-shaped bulging portion in an upper portion, the bulging portion bulging upwardly in a side view, and the switching operation member and the multiple catch mechanisms disposed in base portions of the bulging portion are connected to one another by cables corresponding individually to the catch mechanisms.

6 Claims, 12 Drawing Sheets

(51) Int. Cl.
  *E05B 63/14* (2006.01)
  *E05B 83/16* (2014.01)
  *B62H 5/00* (2006.01)
  *E05C 3/16* (2006.01)
  *E05B 79/20* (2014.01)

(52) U.S. Cl.
  CPC ............ *E05B 79/20* (2013.01); *Y10T 292/108* (2015.04); *Y10T 292/1075* (2015.04)

(58) Field of Classification Search
  CPC ......... Y10T 292/1044; Y10T 292/1043; Y10T 292/1045; Y10T 292/1047; Y10T 292/1048; Y10T 292/1055; Y10T 292/1057; Y10T 292/1059; Y10T 292/1078; Y10T 292/1076; Y10T 70/5757; Y10T 70/5761; Y10T 70/5765; Y10T 70/577; Y10S 292/23; Y10S 292/14; Y10S 292/42; Y10S 292/31; Y10S 292/43; E05B 79/20; E05B 79/22; E05B 63/14; E05B 63/143; E05B 83/16; E05B 83/18; E05B 83/22; E05B 83/24; E05B 83/247; B62J 9/006; B62H 5/006
  See application file for complete search history.

(56) References Cited

U.S. PATENT DOCUMENTS

| | | | | |
|---|---|---|---|---|
| 4,907,428 A * | 3/1990 | Nakashima | ............ | E05B 79/20 180/219 |
| 4,951,486 A * | 8/1990 | Braun | ............ | E05C 9/046 292/DIG. 31 |
| 5,069,491 A * | 12/1991 | Weinerman | ............ | E05B 77/265 292/216 |
| 5,117,665 A * | 6/1992 | Swan | ............ | E05C 9/026 292/48 |
| 5,535,608 A * | 7/1996 | Brin | ............ | E05B 79/20 292/DIG. 14 |
| 6,497,445 B1 * | 12/2002 | Combs, II | ............ | B60J 7/1621 296/100.06 |
| 6,623,071 B2 * | 9/2003 | Kawamoto | ............ | B62J 1/12 297/188.09 |
| 6,964,440 B2 * | 11/2005 | Lebsack | ............ | E05B 79/20 292/DIG. 23 |
| 7,708,326 B2 * | 5/2010 | Misaki | ............ | B62J 9/00 292/259 A |
| 7,735,881 B2 * | 6/2010 | Steffens | ............ | B60J 7/141 292/DIG. 31 |
| 2005/0206172 A1 * | 9/2005 | Bacon | ............ | E05B 17/0004 292/216 |
| 2005/0264024 A1 * | 12/2005 | Mulder | ............ | E05B 79/20 296/100.07 |
| 2006/0082161 A1 * | 4/2006 | Minix | ............ | E05B 13/10 292/28 |
| 2008/0252092 A1 * | 10/2008 | Waldner | ............ | E05B 79/20 296/51 |
| 2011/0140461 A1 * | 6/2011 | Murray | ............ | E05B 79/20 292/216 |
| 2014/0132011 A1 * | 5/2014 | Krishnan | ............ | E05B 79/20 292/217 |

\* cited by examiner

SADDLE BAG LOCK DEVICE FOR SADDLE-RIDE TYPE VEHICLE

CROSS-REFERENCE TO RELATED APPLICATIONS

The present application claims priority under 35 USC 119 to Japanese Patent Application No. 2014-000869 filed Jan. 7, 2014 the entire contents of which are hereby incorporated by reference.

BACKGROUND OF THE INVENTION

1. Field of the Invention

The present invention relates to a saddle bag lock device for a saddle-ride type vehicle, in which multiple strikers are provided on a lid openably and closably attached to each of bag base bodies fixed to left and right sides of a rear portion of a vehicle body, the lid forming a saddle bag together with the corresponding bag base body. Each of the bag base bodies is provided with multiple catch mechanisms switchable between a locked state where the catch mechanisms are engaged with the strikers to lock the lid at a closed position and an unlocked state where the catch mechanisms are disengaged from the strikers to allow opening of the lid. A switching operation means includes a manually-operable operation member that is provided on the vehicle body side. The switching operation means is manually-operable to synchronously the switching the multiple catch mechanisms from the locked state to the unlocked state.

2. Description of Background Art

A device in which paired front and rear catch mechanisms are provided in a saddle bag with a connecting rod being a rigid body that is provided between the catch mechanisms to synchronously activate the catch mechanisms is disclosed in Japanese Patent Application Publication No. 2006-281893.

The connecting rod disclosed in Japanese Patent Application Publication No. 2006-281893 is required to extend substantially linearly so as to suppress the effects of bending and deformation due to a transmitted force, thereby synchronizing movements of the paired catch mechanisms. In view of this requirement, there are limitations in the design of the saddle bag and there is also a possibility that the saddle bag is reduced in capacity and becomes less attractive as a product.

SUMMARY AND OBJECTS OF THE INVENTION

The present invention is made in view of the circumstances described above, and an object of an embodiment of the present invention is to provide a saddle bag lock device for a saddle-ride type vehicle in which multiple catch mechanisms can be synchronized while the attractiveness of a saddle bag as a product is improved by making it possible to increase the degree of freedom in design and the capacity of the saddle bag.

For the purpose of achieving the above-mentioned object, an embodiment of the present invention provides a saddle bag lock device for a saddle-ride type vehicle, in which a plurality of strikers are provided on a lid openably and closably attached to each of bag base bodies fixed to left and right sides of a rear portion of a vehicle body, the lid forming a saddle bag together with the corresponding bag base body, each of the bag base bodies is provided with a plurality of catch mechanisms switchable between a locked state where the catch mechanisms are engaged with the strikers to lock the lid at a closed position and an unlocked state where the catch mechanisms are disengaged from the strikers to allow opening of the lid. A switching operation means includes a manually-operable operation member that is provided on the vehicle body side. The switching operation means is manually-operable to synchronously switch the plurality of catch mechanisms from the locked state to the unlocked state. The saddle bag is formed to have a mountain-shaped bulging portion in an upper portion. The bulging portion bulges upwardly in a side view. The switching operation means and the plurality of catch mechanisms, disposed in base portions of the bulging portion, are connected to one another by cables corresponding individually to the catch mechanisms.

According to an embodiment of the present invention, the switching operation means includes a bracket which has two plate-shaped supporting plate portions and which is fixed to the bag base body. An operation lever, which serves as the operation member, is supported by the supporting plate portions via a pivot to be operable by being pulled upwardly in a case of switching the catch mechanisms from the locked state to the unlocked state. A plurality of lock plates are individually connected to the plurality of cables and are supported by the supporting plate portions to move in a vehicle front-rear direction according a pulling-up operation of the operation lever. The switching operation means is disposed above the plurality of catch mechanisms at a position overlapping an upper portion of the bulging portion in the side view.

According to an embodiment of the present invention, each of the catch mechanisms includes a striker engagement member which is movable between an unlocked position where engagement starts and disengagement of a corresponding one of the strikers is enabled and a locked position where the disengagement of the corresponding striker is disabled and which is biased toward the unlocked position. A restriction member is movable between a restriction position restricting the striker engagement member at the locked position by engaging with the striker engagement member at the locked position and a restriction release position disengaged from the striker engagement member and which is biased toward the restriction position. The cables are connected to the restriction members to pull the restriction members toward the restriction release positions upon the pulling-up operation of the operation lever.

According to an embodiment of the present invention, each of the lock plates is provided with a turn prevention portion which comes into contact with the operation lever biased toward a not-operated position and prevents the operation lever from turning toward the not-operated position when the restriction member is in contact with the striker engagement member at an intermediate position between the locked position and the unlocked position and is at an intermediate position between the restriction position and the restriction release position.

According to an embodiment of the present invention, a synchronization adjustment mechanism is provided in an end portion of each of the plurality of cables on the switching operation means side. The striker engagement member and the restriction member of each of the plurality of catch mechanisms are provided respectively with alignment marks for determining positions of the striker engagement member and the restriction member in a state where the restriction member at the restriction position is engaged with the striker engagement member at the locked position.

According to an embodiment of the present invention, the operation lever has a flat plate-shaped operation plate portion that is operable by pulling upwardly a rear portion of the operation plate portion in a vehicle front-rear direction. A top surface of the operation plate portion of the operation lever, at a not-operated position, is disposed to be continuously flush with a top surface of a cover member forming part of a vehicle body cover. The top surface of the cover member being inclined upwardly toward the front, and the plurality of cables are connected to front portions of the plurality of locked plates in the vehicle front-rear direction.

According to an embodiment of the present invention, the lid is supported by a lower portion of the bag base body via a hinge to be openable outwardly in a vehicle width direction. Recess portions recessed rearwardly in a vehicle front-rear direction are formed in front portions of the bag base body and the lid in the vehicle front-rear direction, and a foot rest portion on which an occupant places his/her foot is disposed in the recess portions.

According to an embodiment of the present invention, the saddle bag has the mountain-shaped bulging portion bulging upward in the side view in the upper portion. Thus, it is possible to achieve a saddle bag shape extending along the shape of the rear portion of the saddle-ride type vehicle and increase the degree of freedom in design of the saddle bag. Furthermore, in order to efficiently support the lid in the closed state in such a mountain-shaped saddle bag, it is desirable to dispose the catch mechanisms in the base portions of the bulging portion. In this case, if a connecting rod which is a rigid body is used as in a conventional case, a dead space is formed and this does not lead to an increase in capacity. However, since the switching operation means is connected to the plurality of catch mechanisms via the cables corresponding individually to the catch mechanisms, it is possible to make the dead space as small as possible and make effective use of the capacity increase due to the bulging portion. In other words, it is possible to increase the degree of freedom in design of the saddle bag and also increase the capacity thereof to make the saddle bag more attractive as a product.

According to an embodiment of the present invention, since the cables are connected to the lock plates configured to move in the vehicle front-rear direction according the pulling-up operation of the operation lever which serves as the operation member, force in an up-down direction generated by the operation of the operation lever from above the saddle bag is converted into force in the vehicle front-rear directions to pull the cables. This enables synchronous movement of the plurality of catch mechanisms, and the operability can be thus secured.

According to an embodiment of the present invention, each of the catch mechanisms includes the striker engagement member with which the corresponding striker can engage and the restriction member which is engaged with the striker engagement member at the locked position where the disengagement of the striker is disabled. The cables are connected to the restriction members to pull the restriction members in such a direction that the restriction members are disengaged from the striker engagement members, upon the pulling-up operation of the operation lever. Accordingly, a force for switching the catch mechanisms from the locked state to the unlocked state can be effectively transmitted to the catch mechanisms by the cables.

According to an embodiment of the present invention, the operation lever biased toward the not-operated position comes into contact with the turn prevention portion provided in each of the lock plates and is prevented from turning toward the not-operated position when the restriction member is in contact with the striker engagement member in a state where the striker engagement member is at the intermediate position between the locked position and the unlocked position, i.e. in a state where the catch mechanism is not in the completely locked state. Accordingly, it is possible to easily know that the catch mechanism is not in the completely locked state, from the operation lever not returning to the not-operated position, without using a sensor or the like. Thus, the cost can be reduced.

According to an embodiment of the present invention, it is possible to easily perform the synchronization adjustment among the plurality of catch mechanisms and the operation lever by using the synchronization adjustment mechanism provided in the end portion of each of the cables on the switching operation means side and the alignment marks provided respectively in the striker engagement member and the restriction member of each of the plurality of catch mechanisms.

According to an embodiment of the present invention, the top surface of the flat plate-shaped operation plate portion included in the operation lever is continuously flush with the top surface of the cover member which is inclined upwardly toward the front when the operation lever is at the not-operated position. Accordingly, an excellent external appearance can be obtained. In addition, since the rear portion of the operation plate portion in the vehicle front-rear direction can be operated by being pulled upwardly, the operability can be improved.

According to an embodiment of the present invention, since the lid is supported by the lower portion of the bag base body via the hinge to be openable outwardly in the vehicle width direction and the foot rest portion for the occupant is disposed in the recess portions provided in the front portions of the bag base body and the lid in the vehicle front-rear direction, it is possible to facilitate opening of the lid and also secure the foot rest portion for the occupant even when the lid is closed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described with reference to the attached drawings. Note that up, down, front, rear, left, and right in the following description refer to directions as viewed from an occupant riding on a motorcycle.

Figure 1:
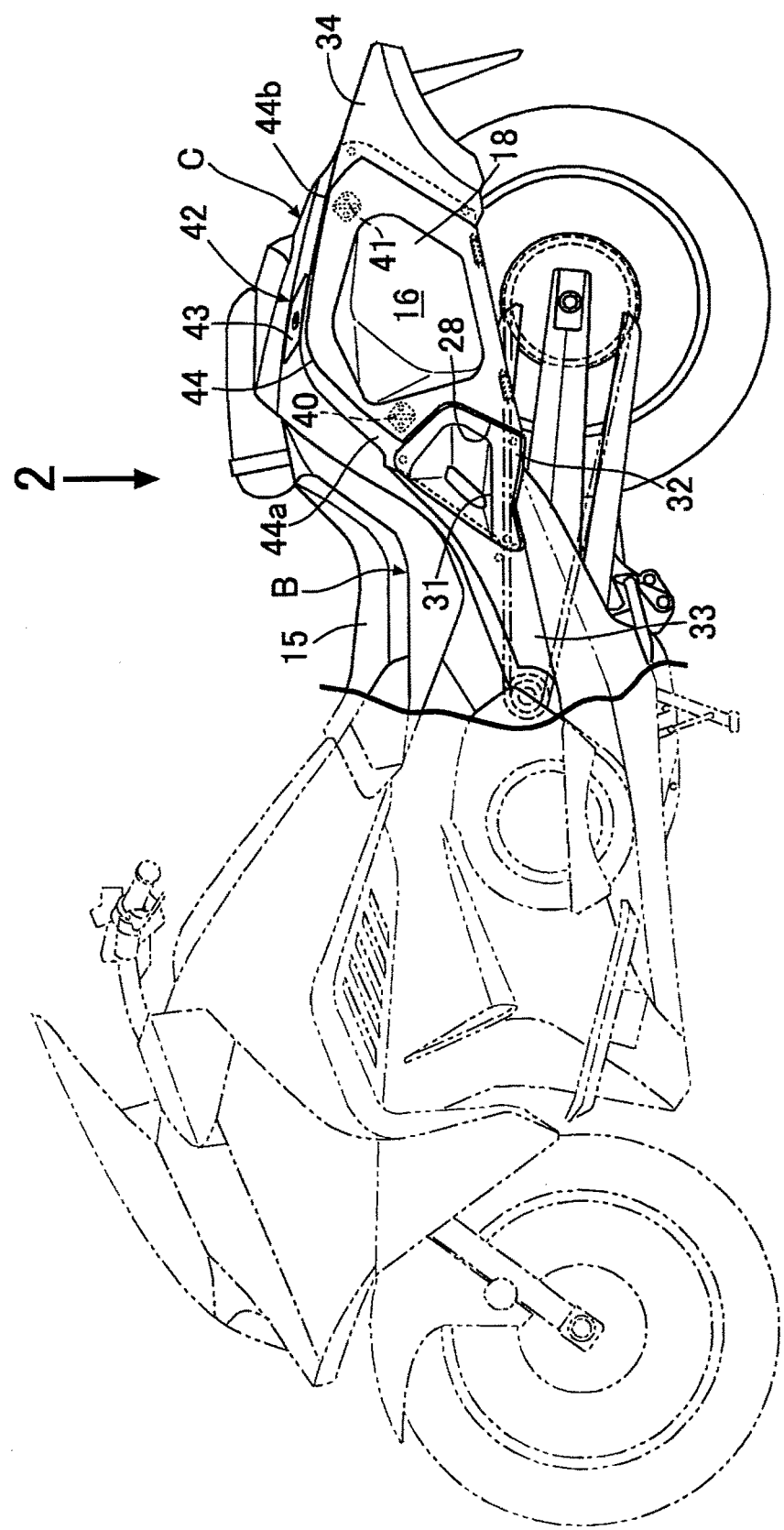
FIG. 1 is a side view showing a motorcycle with part of the motorcycle being omitted.
Figure 2:
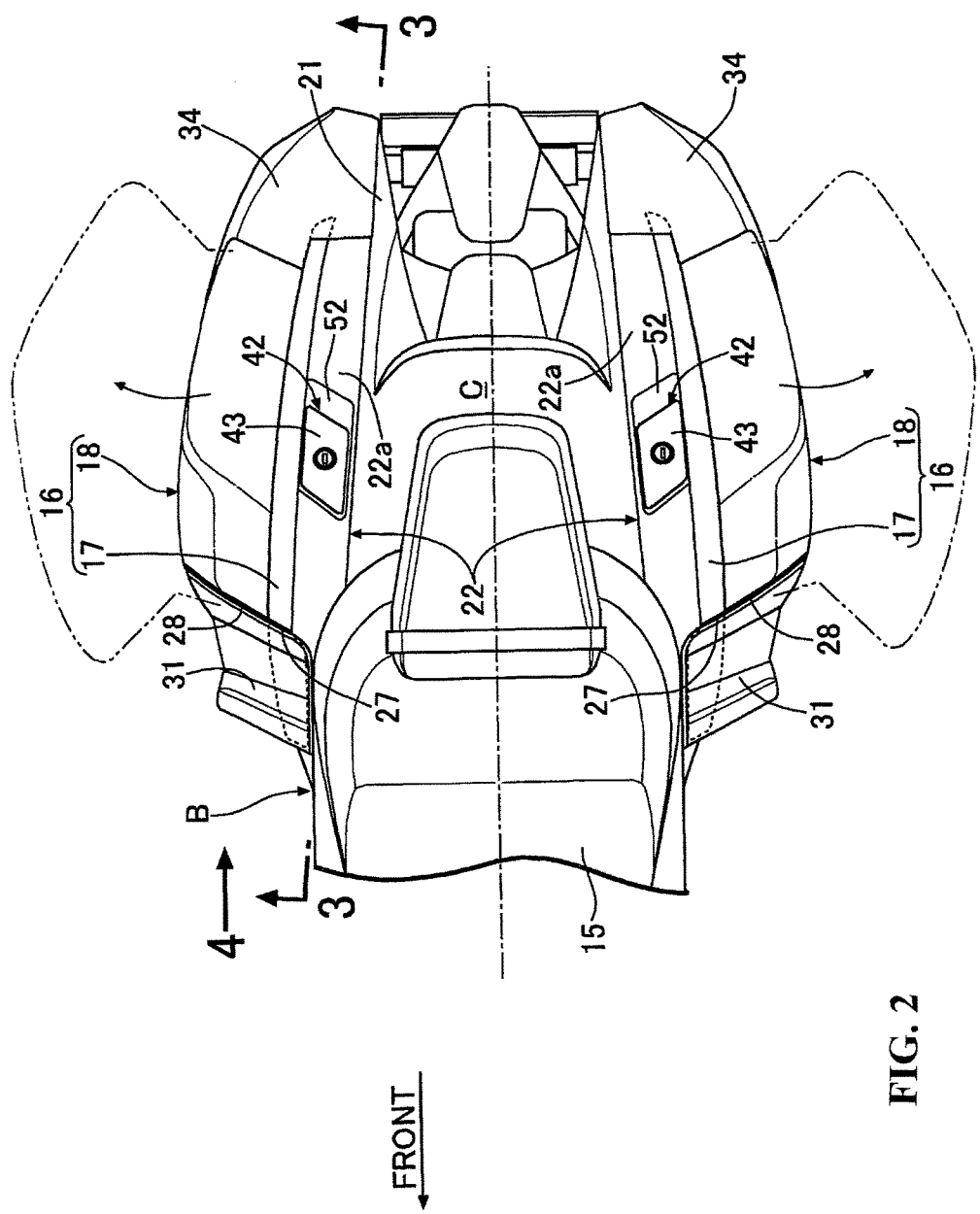
FIG. 2 is a view in the direction of the arrow 2 in FIG. 1.

First, in FIGS. 1 and 2, saddle bags 16, 16 are provided respectively on left and right sides of a rear portion of a vehicle body B of a motorcycle, which is a saddle-ride type vehicle, to be located behind an occupant seat 15 on which the occupant sits. The saddle bags 16, 16 are each formed of a bag base body 17 fixed to the vehicle body B and a lid 18 openably and closably attached to the bag base body 17.

Figure 3:
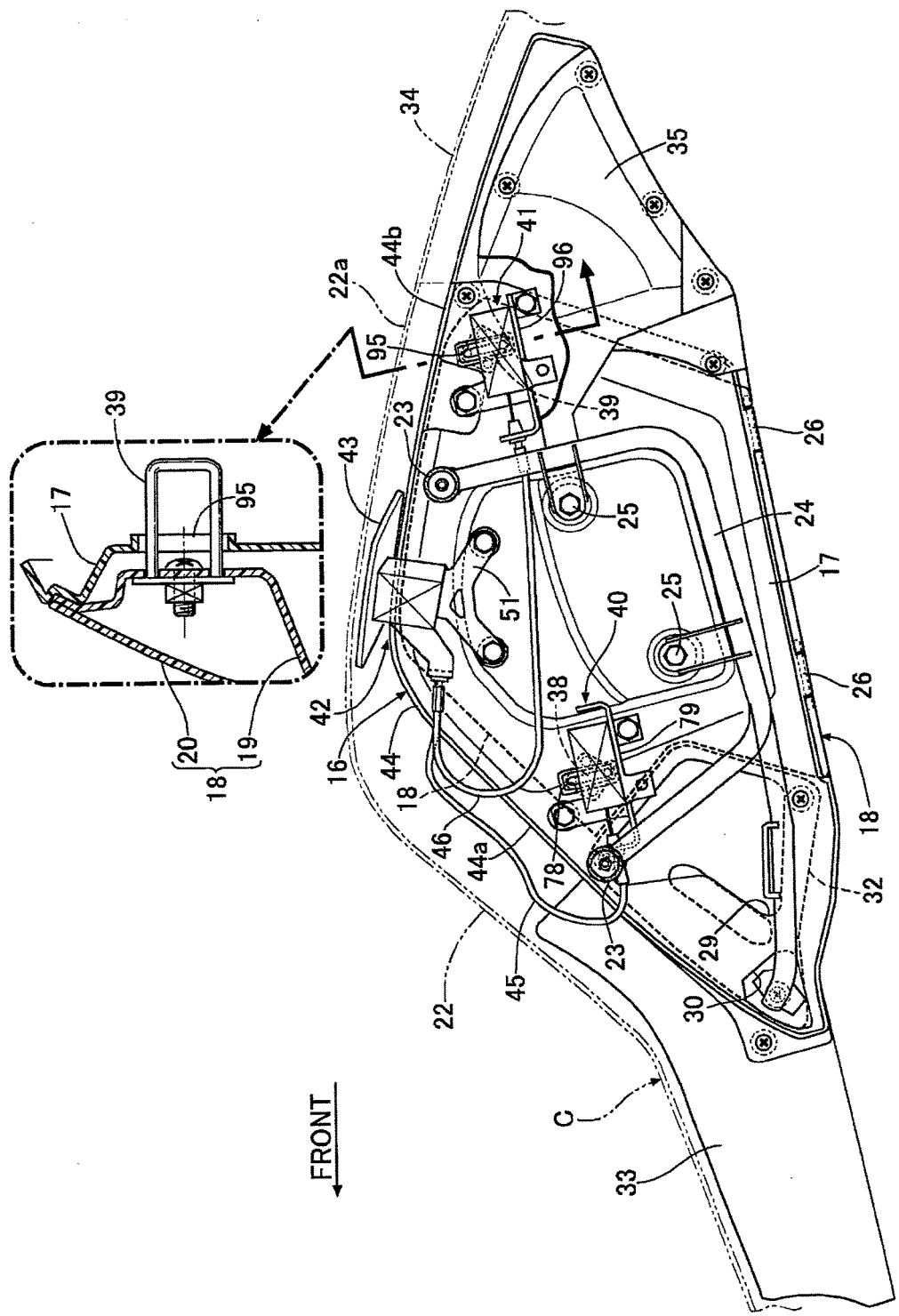
FIG. 3 is a cross-sectional view taken along the line 3-3 in FIG. 2.
Figure 4:
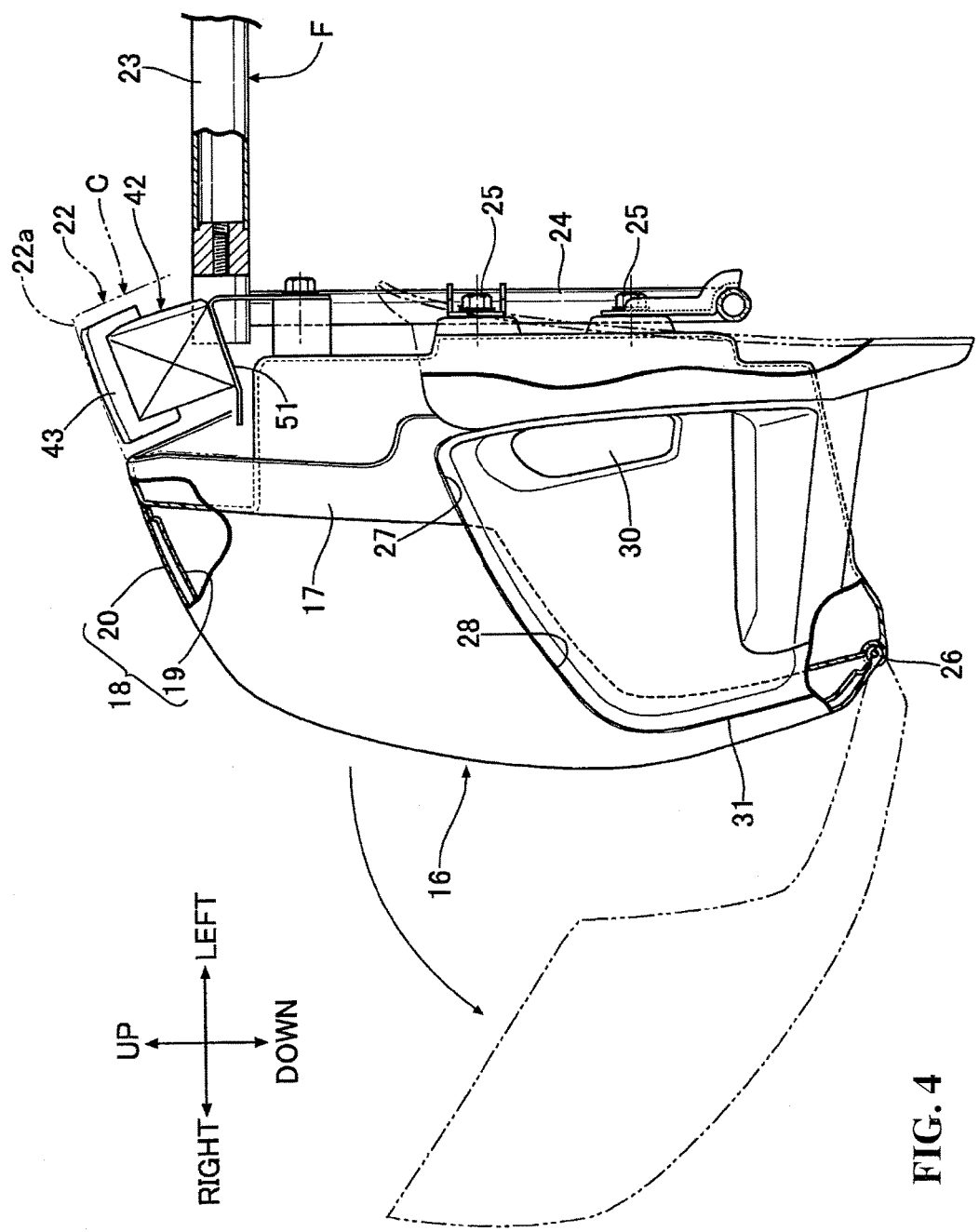
FIG. 4 is a partially-cutaway cross-sectional view of part of a vehicle body and a saddle bag as viewed from the direction of the arrow 4 in FIG. 2.

Referring also to FIGS. 3 and 4, the vehicle body B is formed of a vehicle body frame F and a vehicle body cover C covering the vehicle body frame F and made of synthetic resin. The vehicle body cover C includes a rear cover 21 disposed behind the occupant seat 15 to cover a rear portion of the vehicle body frame F from above and paired left and right upper side covers 22, 22 disposed to extend from left and right sides of the occupant seat 15 to left and right sides of the rear cover 21. The saddle bags 16, 16 are disposed on outer lateral sides of the upper side covers 22, 22.

Since the left and right saddle bags 16, 16 are formed to be left-right symmetric and basically have the same configuration, description is given below only of the configuration related to the right saddle bag 16. A description of the left saddle bag 16 is omitted.

A bag supporting frame 24 made of a metal pipe is fastened to outer end portions of paired front and rear cross members 23, 23 included in the rear portion of the vehicle body frame F and extends in a vehicle width direction. The bag base body 17 is fastened to the bag supporting frame 24 by bolts 25 at multiple points on an inner surface of the bag base body 17 on an inner side in the vehicle width direction, and is thereby supported by the rear portion of the vehicle body frame F via the bag supporting frame 24.

The lid 18 is formed by attaching a decorative cover 20 covering an inner lid 19 from the outside of the inner lid 19. The lid 18 is formed in a bowl shape bulging outwardly in the vehicle width direction in a closed state. The lid 18 is supported at two points in a lower portion of the bag base body 17 which are spaced away from each other in a front-rear direction, via hinges 26, 26 to be openable outward in the vehicle width direction.

A recess portion 27 recessed rearwardly is formed in a front portion of the bag base body 17, and opening portions 29, 30 arranged respectively at two positions in the recess portion 27 are provided in the bag base body 17. In addition, a recess portion 28 corresponding to the recess portion 27 of the bag base body 17 is formed in the lid 18 to be recessed rearwardly. A foot rest portion 31, where the occupant sitting on the occupant seat 15 places his/her foot, is disposed in the recess portions 27, 28. The foot rest portion 31 is formed of a foot rest portion forming member 32 made of synthetic resin, and the foot rest portion forming member 32 is fastened to the bag supporting frame 24 in the opening portions 29, 30 provided respectively at two positions in the recess portion 27 of the bag base body 17.

The saddle bag 16 has the shape bulging outwardly in the vehicle width direction in the closed state. In order to achieve an excellent external appearance by smoothly connecting this saddle bag 16 and the vehicle body cover C, a front extension cover 33 extending in a forward direction from the foot rest portion 31 is attached to the front portion of the bag base body 17. A rear extension cover 34 is smoothly continuous with a rear portion of the saddle bag 16 and is disposed on a lateral side of a rear portion of the upper side cover 22. The rear extension cover 34 is supported by a supporting plate 35 attached to the bag base body 17.

Figure 5:
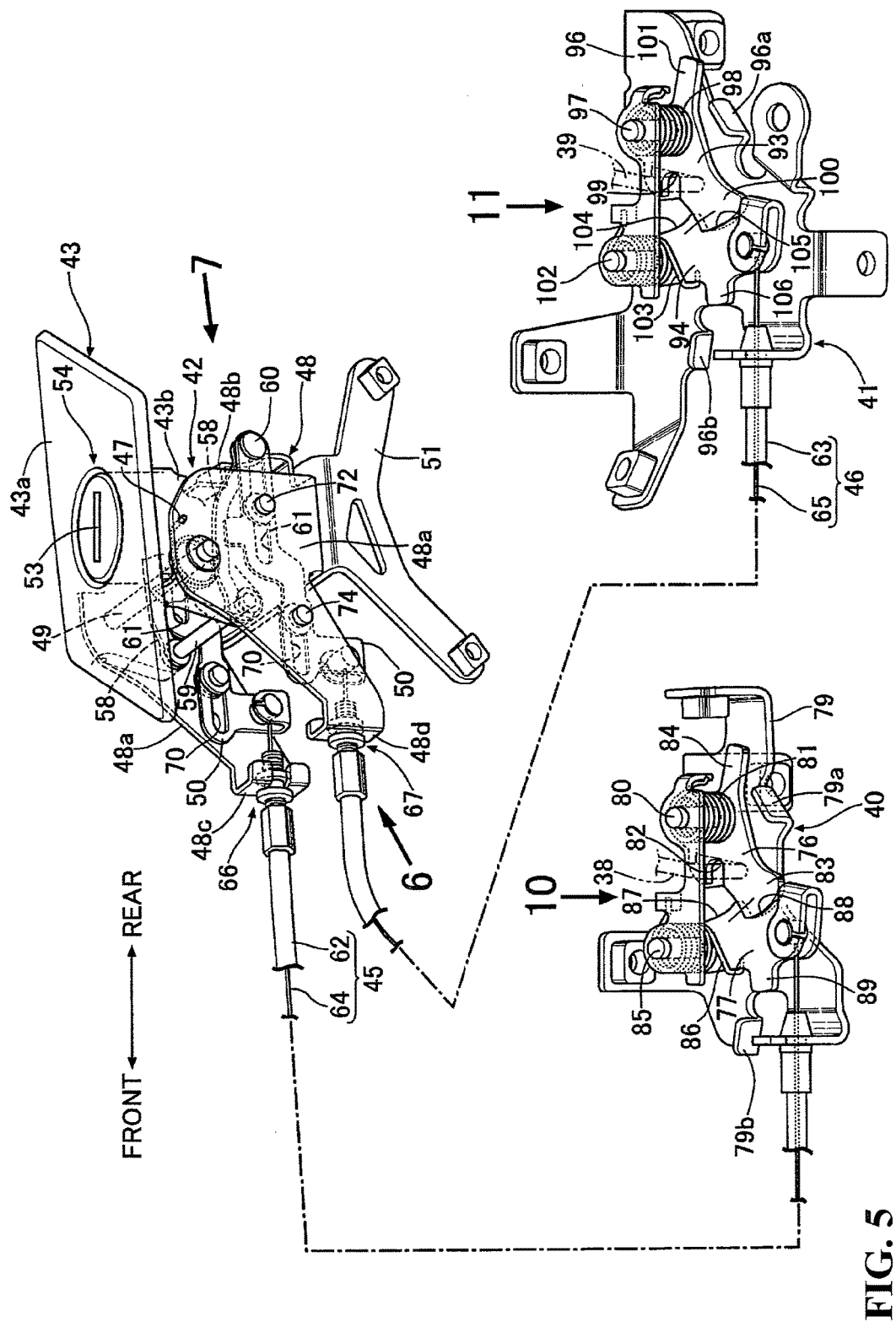
FIG. 5 is a perspective view showing configurations of switching operation means and paired catch mechanisms.

Referring to FIG. 5, multiple substantially U-shaped strikers 38, 39 are provided on the lid 18. In this embodiment, the front striker 38 is fixed to a front portion of the inner lid 19 of the lid 18, and the rear striker 39 is fixed to a rear portion of the inner lid 19 of the lid 18. In addition, multiple catch mechanisms 40, 41 are provided in the bag base body 17. In the embodiment, the bag base body 17 is provided with the front catch mechanism 40 switchable between a locked state where the front catch mechanism 40 is engaged with the front striker 38 to lock the lid 18 at the closed position and an unlocked state where the front catch mechanism 40 is disengaged from the front striker 38. The rear catch mechanism 41 is switchable between the locked state where the rear catch mechanism 41 is engaged with the rear striker 39 to lock the lid 18 at the closed position and the unlocked state where the rear catch mechanism 41 is allowed to disengage from the rear striker 39. The front and rear catch mechanisms 40, 41 provided on the bag base body 17 allow the opening of the lid 18 in the unlocked state of the catch mechanisms 40, 41.

Further, switching operation means 42 is provided on the vehicle body B side and includes an operation lever 43 which is a manually-operable operation member. The switching operation means 42 is manually-operable to synchronously switch the front catch mechanism 40 and the rear catch mechanism 41 from the locked state to the unlocked state. In the embodiment, the switching operation means 42 is provided in the bag base body 17 fixed to the vehicle body B.

The saddle bag 16 is formed to have a mountain-shaped bulging portion 44 in an upper portion, the bulging portion 44 bulging upwardly in a side view. The front catch mechanism 40 is disposed in a front base portion 44a of the bulging portion 44, and the rear catch mechanism 41 is disposed in a rear base portion 44b of the bulging portion 44. Moreover, the switching operation means 42 is disposed above the front catch mechanism 40 and the rear catch mechanism 41 at a position overlapping an upper portion of the bulging portion 44 in the side view. Furthermore, the front catch mechanism 40, the rear catch mechanism 41, and the switching operation means 42 are connected to one another by cables 45, 46 corresponding individually to the catch mechanisms 40, 41.

Figure 6:
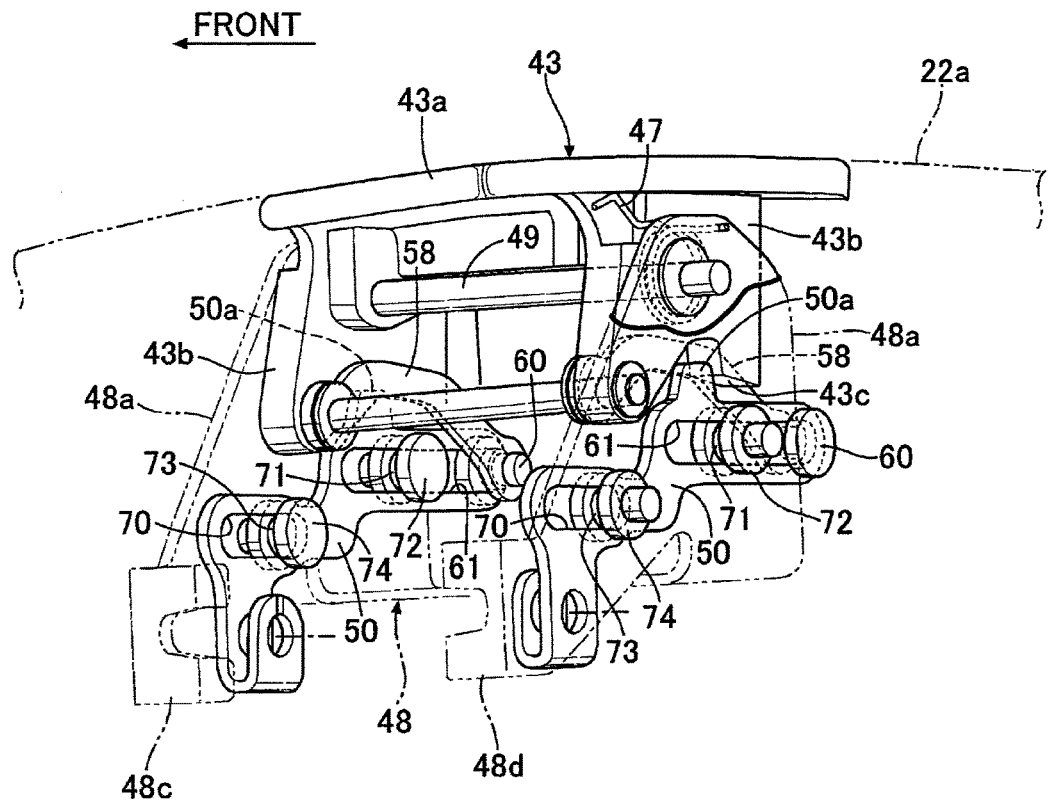
FIG. 6 is a perspective view of the switching operation means as viewed from the direction of the arrow 6 in FIG. 5.
Figure 7:
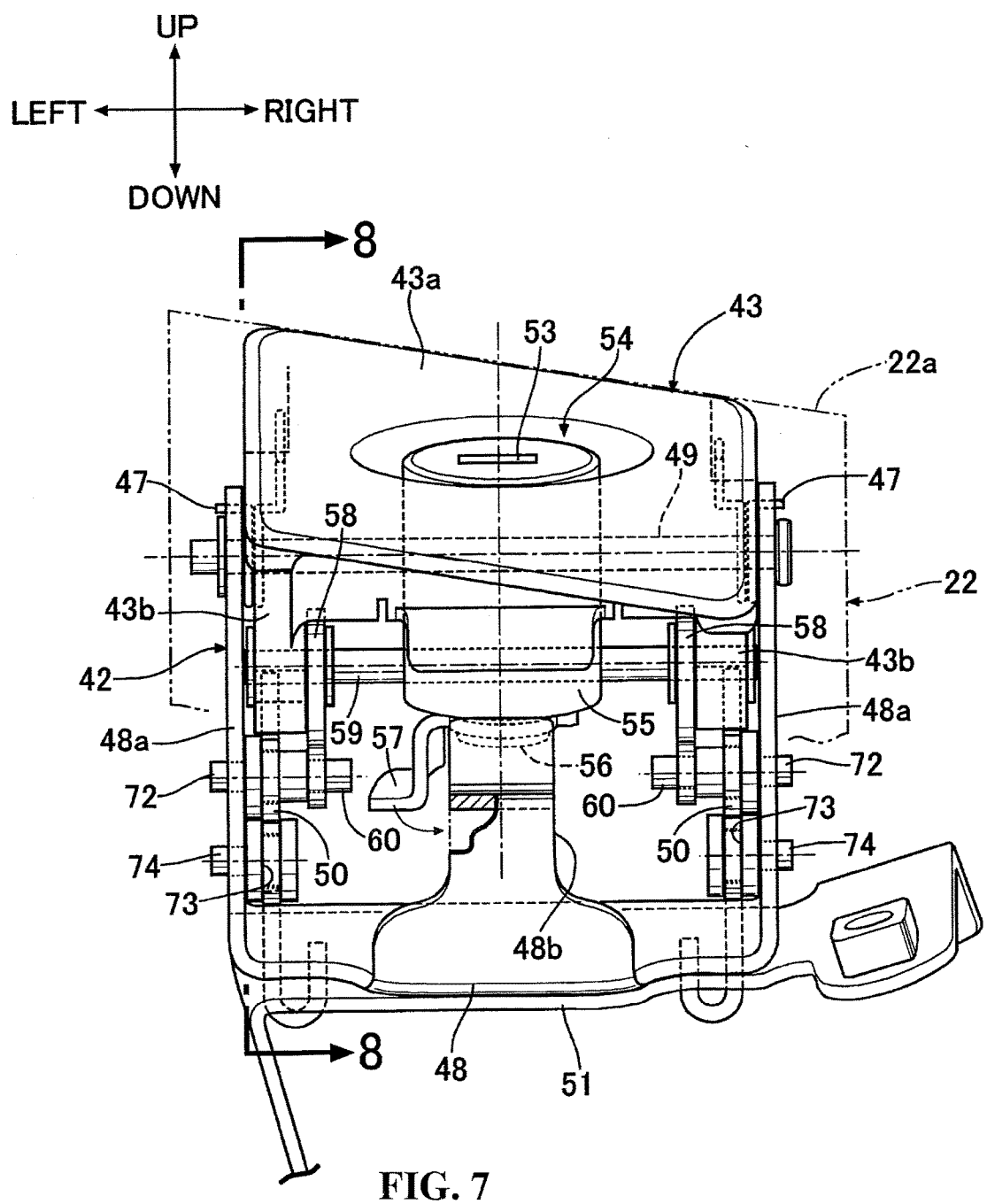
FIG. 7 is a view of the switching operation means as viewed from the direction of the arrow 7 in FIG. 5.
Figure 8:
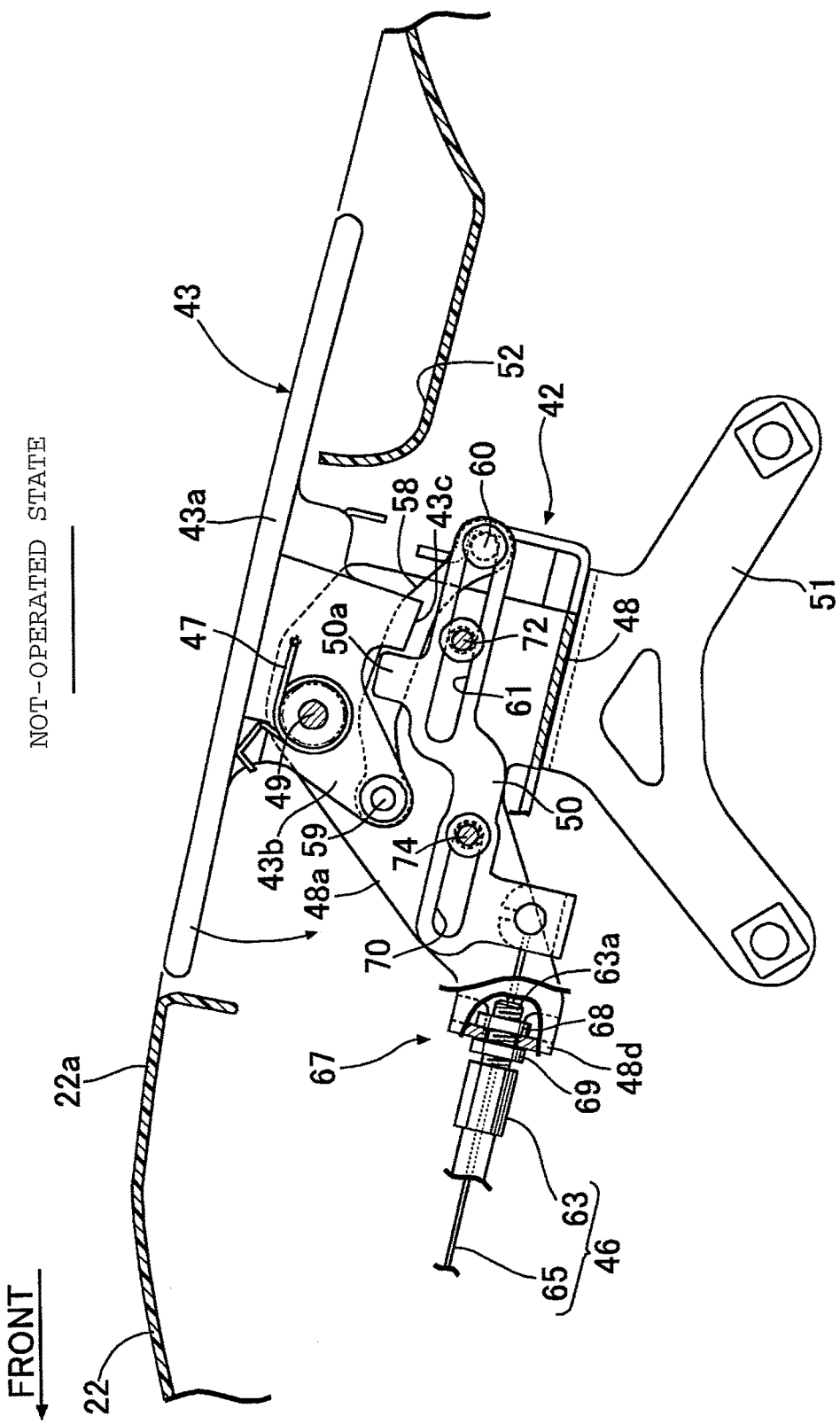
FIG. 8 is a cross-sectional view taken along the line 8-8 in FIG. 7.

Referring to FIGS. 6 to 8, the switching operation means 42 includes a bracket 48 which has two plate-shaped supporting plate portions 48a, 48a and which is fixed to the bag base body 17. The operation lever 43 is supported by the supporting plate portions 48a, 48a via a pivot 49 to be operable by being pulled upwardly in a case of switching the front catch mechanism 40 and the rear catch mechanism 41 from the locked state to the unlocked state. Paired lock plates 50, 50 are individually connected to the cables 45, 46 corresponding individually to the front catch mechanism 40 and the rear catch mechanism 41 and are supported by the supporting plate portions 48a, 48a to move in a front-rear direction (rear direction in this embodiment) upon a pulling-up operation of the operation lever 43.

A supporting stay 51 is fastened to an inner surface of the bag base body 17 extending along the vehicle width direction. The bracket 48 is fixedly attached onto the supporting stay 51. The operation lever 43 is formed to integrally include a flat plate-shaped operation plate portion 43a and paired side plate portions 43b, 43b provided continuously with the operation plate portion 43a, on both sides thereof in the vehicle width direction. The paired side plate portions 43b, 43b are supported by the supporting plate portions 48a, 48a of the bracket 48 via the pivot 49.

Figure 9:
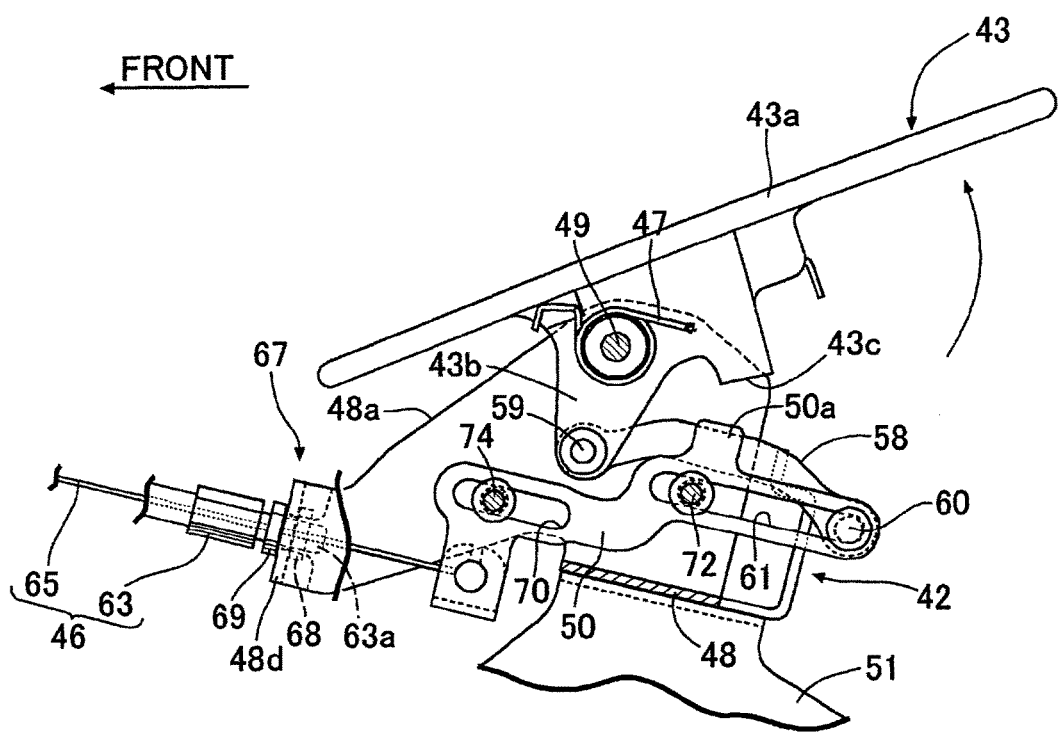
FIG. 9 is a cross-sectional view corresponding to FIG. 8 in a state where the switching operation means is operated.

The operation lever 43 is turnable between an operated position where a rear portion of the operation plate portion 43a is operated by being pulled upwardly as shown in FIG. 9 and a not-operated position (position shown in FIG. 8) where a top surface of the operation plate portion 43a is continuously flush with a top surface 22a of the upper side cover 22 which is a cover member forming part of the vehicle body cover C with the top surface 22a being inclined upward toward the front. An operation recess portion 52 (see FIG. 8) for grabbing the rear portion of the operation plate portion 43a is formed in the top surface 22a of the upper side cover 22 which is inclined upward toward the front.

Moreover, return springs 47, 47 which are torsion springs surrounding the pivot 49 are provided between the supporting plate portions 48a, 48a of the bracket 48 and the side plate portions 43b, 43b of the operation lever 43. The operation lever 43 is spring-biased toward the not-operated position by biasing force generated by the return springs 47, 47.

A cylinder body 55 of a cylinder lock 54 is attached to the operation plate portion 43a of the operation lever 43 in such a way that a key hole 53 is opened in a center portion of the top surface of the operation plate portion 43a. A rotor 56 configured to turn according an operation of inserting a regular mechanical key into the key hole 53 and turning the key is turnably inserted in the cylinder body 55. A locking protruding portion 48b which is engaged with an engagement protruding portion 57 in a not-operated state of the cylinder lock 54 is provided in the bracket 48. The engagement protruding portion 57 provided in a protruding portion of the rotor 56 which protrudes out from the cylinder body 55. Disengaging the engagement protruding portion 57 from the locking protruding portion 48b according to an unlocking operation of the cylinder lock 54 allows the turning operation of the operation lever 43 from the not-operated position toward the operated position.

The paired lock plates 50, 50 are disposed between the supporting plate portions 48a, 48a of the bracket 48 and the side plate portions 43b, 43b of the operation lever 43 to extend in the front-rear direction. The operation lever 43 is connected to the lock plates 50, 50 via paired connecting rods 58, 58 which are disposed inside the side plate portions 43b, 43b of the operation lever 43 and which extend in the front rear direction.

Front end portions of the connecting rods 58, 58 are connected to front portions of the side plate portions 43b, 43b of the operation lever 43 via a single first connecting pin 59 common to both of the connecting rods 58, 58. In addition, second connecting pins 60, 60 are provided individually in rear end portions of the connecting rods 58, 58. The second connecting pins 60, 60 are inserted into elongated hole-shaped connecting holes 61, 61 which are formed in rear portions of the lock plates 50, 50 and which elongate in the front-rear direction. The second connecting pins 60, 60 are set to be at rear end positions of the connecting holes 61, 61 in a state where the operation lever 43 is at the not-operated position.

In such a connection structure of the operation lever 43 and the lock plates 50, 50, when the operation lever 43 is operated in such a way that the rear portion of the operation plate portion 43a is pulled upwardly, the lock plates 50, 50 are pushed by the second connecting pins 60, 60 of the connecting rods 58, 58 to be moved rearwardly.

The cables 45, 46 are formed by movably inserting inner cables 64, 65 into outer cables 62, 63. These cables 45, 46 are connected to front portions of the paired lock plates 50, 50 included in the switching operation means 42. In other words, the cables 45, 46 are pulled by rearward movement of the lock plates 50, 50 caused by the operation of the operation lever 43.

Cable supporting portions 48c, 48d configured to support one end portions of the outer cables 62, 63 are provided integrally in front portions of the bracket 48. Synchronization adjustment mechanisms 66, 67 are provided between the one end portions of the outer cables 62, 63 and the cable supporting portions 48c, 48d.

The synchronization adjustment mechanism 67 includes a screw shaft portion 63a provided in the one end portion of the outer cable 63 and penetrating the cable supporting portion 48d with paired nuts 68, 69 screwed to the screw shaft portion 63a from both sides of the cable supporting portion 48d for adjusting a position where the one end portion of the outer cable 63 is supported by the cable supporting portion 48d. The synchronization adjustment mechanism 66 also has a configuration similar to the synchronization adjustment mechanism 67, and can adjust a position where the one end portion of the outer cable 62 is supported by the cable supporting portion 48c.

A guide hole 70 elongated in the front-rear direction is provided in each of the front portions of the lock plates 50. Each of the supporting plate portions 48a of the bracket 48 is provided with a first guide portion 72 being inserted into the connecting hole 61 and having, on an outer periphery, an annular groove 71 to which a corresponding one of the lock plates 50 is fitted. A second guide portion 74 is inserted into the guide hole 70 and includes, on an outer periphery, an annular groove 73 to which the corresponding lock plate 50 is fitted. The front-rear direction movement of the lock plate 50 is thus guided by the first and second guide portions 72, 74.

Figure 10A:
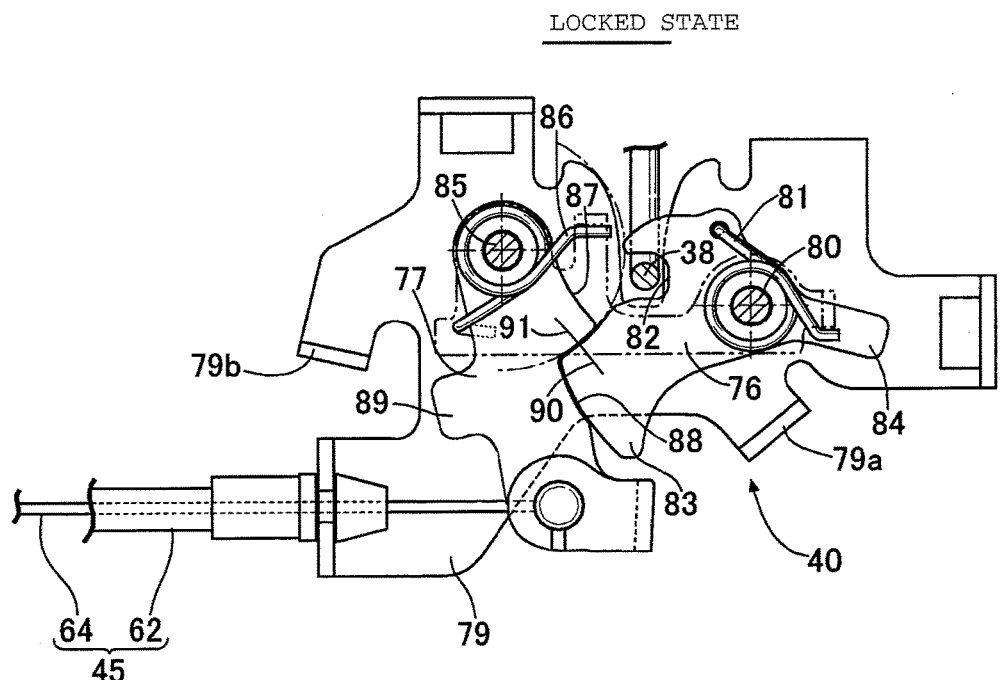
FIGS. 10(A) and 10(B) are side views showing a locked state in 10(A) and an unlocked state in 10(B) of a front catch mechanism in comparison to each other, as viewed from the direction of the arrow 10 in FIG. 5.
Figure 10B:
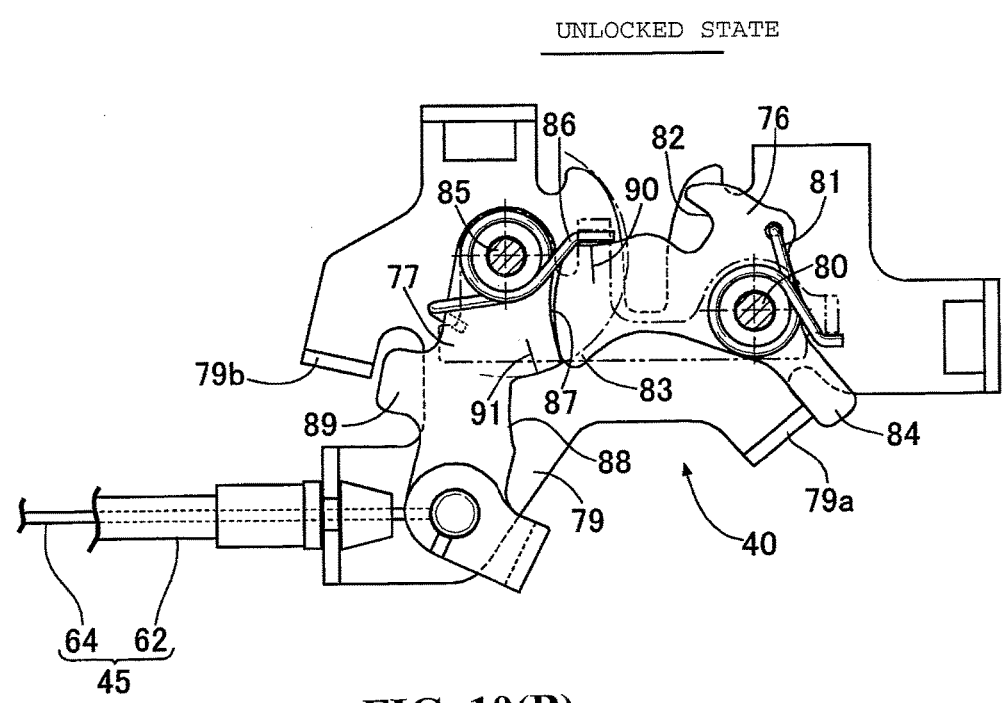

Referring also to FIGS. 10(A) and 10(B), the front catch mechanism 40 includes a striker engagement member 76 which is movable between an unlocked position where engagement start and disengagement of the front striker 38 is enabled and a locked position where the disengagement of the front striker 38 is disabled and which is biased toward the unlocked position. A restriction member 77 is movable between a restriction position restricting the striker engagement member 76 at the locked position by engaging with the striker engagement member 76 at the locked position and a restriction release position disengaged from the striker engagement member 76. The restriction member 77 is biased toward the restriction position. The front catch mechanism 40 is provided on the inner surface of the bag base body 17 in the vehicle width direction, and an insertion hole 78 (see FIG. 3) into which the front striker 38 is inserted to extend to the front catch mechanism 40 side, is provided in the bag base body 17.

The front catch mechanism 40 is provided on a front catch mechanism bracket 79 fixed to the bag base body 17. The striker engagement member 76 is turnably supported by a first supporting shaft 80 provided on the front catch mechanism bracket 79 to engage with the front striker 38 in a state set at the unlocked position shown in FIG. 10(B) and to be turned to the locked position shown in FIG. 10(A) by being pushed by the front striker 38. The striker engagement member 76 is spring-biased toward the unlocked position by a first torsion spring 81 which surrounds the first supporting shaft 80 and which is provided between the front catch mechanism bracket 79 and the striker engagement member 76.

On an outer periphery of the striker engagement member 76, there are provided an engagement recess portion 82 capable of engaging with the front striker 38 to receive the front striker 38 when the striker engagement member 76 is at the unlocked position, a fitting protruding portion 83 protruding outward and being adjacent to the engagement recess portion 82 in a circumferential direction to be capable of being pushed by the front striker 38 inserted into the engagement recess portion 82 and a restriction protruding portion 84 protruding outwardly and toward an opposite side to the engagement recess portion 82 with respect to the first supporting shaft 80. The restriction protruding portion 84 comes into contact with a stopper 79a provided in the front catch mechanism bracket 79 when the striker engagement member 76 is at the unlocked position, and holds the striker engagement member 76 at the unlocked position. Moreover, an outer peripheral surface of the fitting protruding portion 83 is formed in an arc shape along an imaginary circle about the axis of the first supporting shaft 80.

One end portion of the restriction member 77 is supported by a second supporting shaft 85 to be turnable between the restriction position shown in FIG. 10(A) and the restriction release position shown in FIG. 10(B). The second supporting shaft 85 includes an axis parallel to the first supporting shaft 80 and is provided on the front catch mechanism bracket 79. The restriction member 77 is spring-biased toward the restriction position by a second torsion spring 86 which surrounds the second supporting shaft 85 and which is provided between the front catch mechanism bracket 79 and the restriction member 77. The cable 45 is connected to another end portion of the restriction member 77 to pull the restriction member 77 toward the restriction release position upon the pulling-up operation of the operation lever 43.

On a surface of the restriction member 77 facing the striker engagement member 76, there are formed an arc-shaped contact surface 87 which comes into contact with an arc-shaped outer end portion of the fitting protruding portion 83 in the striker engagement member 76 when the restriction member 77 is at the restriction release position and a fitting recess portion 88 which is adjacent to the contact surface 87 and to which the fitting protruding portion 83 of the striker engagement member 76 is fitted when the restriction member 77 is at the restriction position. When the striker engagement member 76 is turned from the unlocked position to the locked position in a state where the restriction member 77 is at the restriction release position, the restriction member 77 is turned from the restriction release position to the restriction position with no pulling force from the cable 45 acting on the restriction member 77. The fitting protruding portion 83 is fitted to the fitting recess portion 88, thereby maintaining the locked state of the striker restriction member 77.

Moreover, a restriction protruding portion 89 is provided on a surface of the restriction member 77 on an opposite side to the striker engagement member 76 to protrude, and comes into contact with a stopper 79b provided in the front catch mechanism bracket 79 to restrict the turning of the restriction member 77 toward the restriction position at an end of the turning.

A linear alignment mark 90 is provided in the fitting protruding portion 83 of the striker engagement member 76 to determine the positions of the striker engagement member 76 and the restriction member 77 in a state where the restriction member 77 at the restriction position is engaged with the striker engagement member 76 at the locked position. A linear alignment mark 91 continuous with the alignment mark 90 when the restriction member 77 is at the restriction position is provided in the restriction member 77.

Figure 11A:
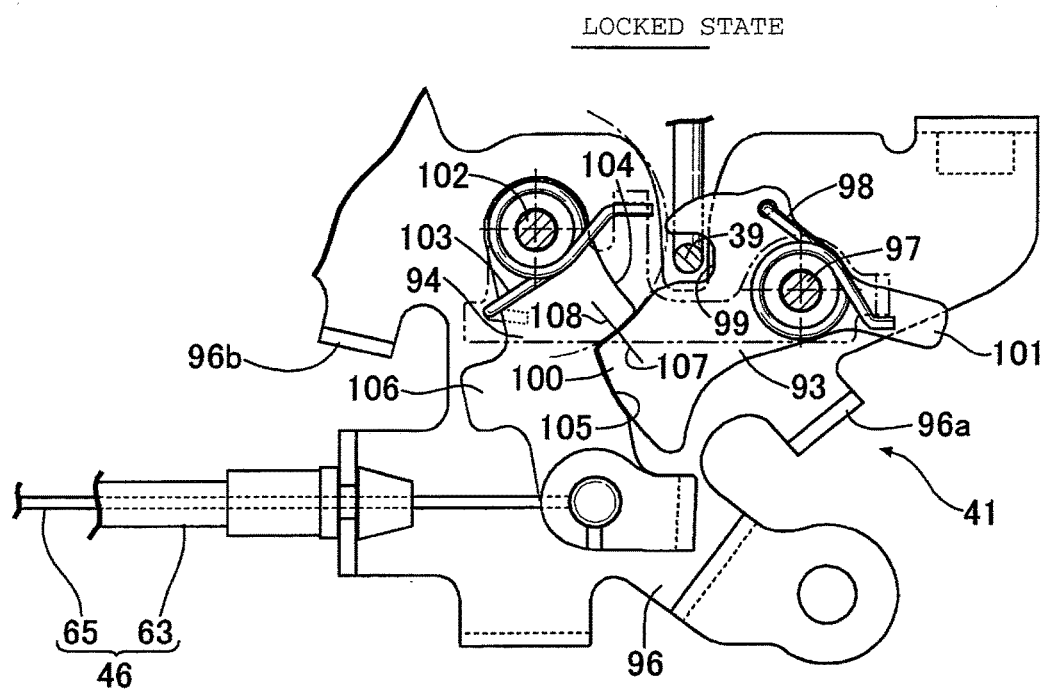
FIGS. 11(A) and 11(B) are side views showing a locked state in 11(A) and an unlocked state in 11(B) of a rear catch mechanism in comparison to each other, as viewed from the direction of the arrow 11 in FIG. 5.
Figure 11B:
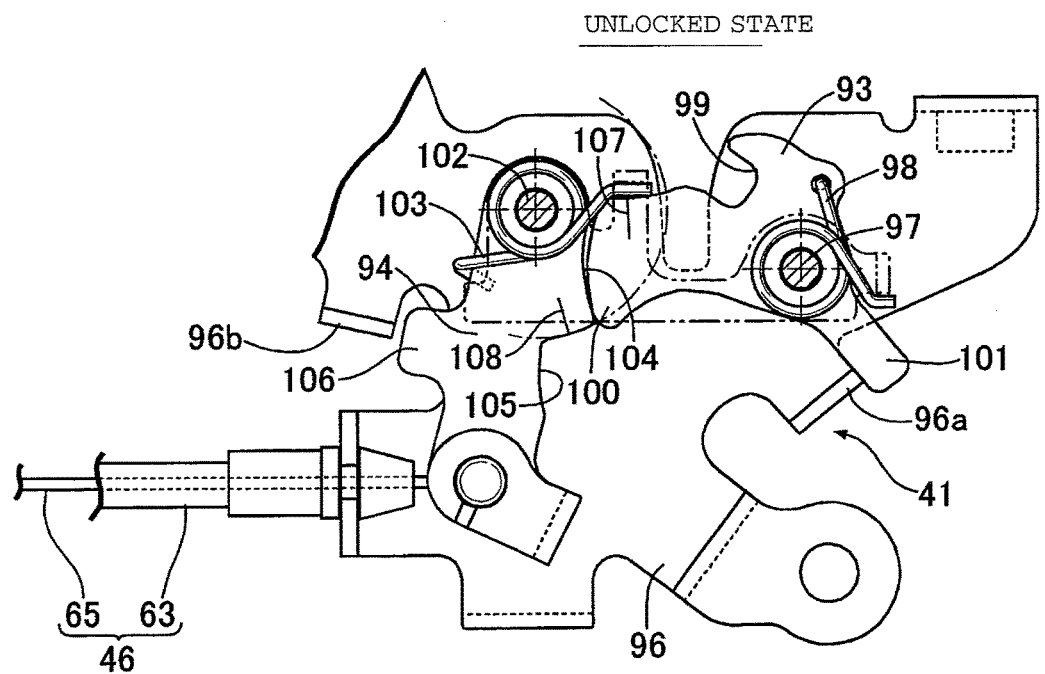

Referring to FIGS. 11(A) and 11(B), the rear catch mechanism 41 includes a striker engagement member 93 which is movable between an unlocked position where engagement start and disengagement of the rear striker 39 is enabled and a locked position where the disengagement of the rear striker 39 is disabled and which is biased toward the unlocked position. A restriction member 94 is movable between a restriction position restricting the striker engagement member 93 at the locked position by engaging with the striker engagement member 93 at the locked position and a restriction release position disengaged from the striker engagement member 93. The restriction member 94 is biased toward the restriction position. The rear catch mechanism 41 is provided on the inner surface of the bag base body 17 in the vehicle width direction. An insertion hole 95 (see FIG. 3) into which the rear striker 39 is inserted to extend to the rear catch mechanism 41 side is provided in the bag base body 17.

The rear catch mechanism 41 is provided on a rear catch mechanism bracket 96 fixed to the bag base body 17. The striker engagement member 93 is turnably supported by a third supporting shaft 97 provided on the rear catch mechanism bracket 96 to engage with the rear striker 39 in a state set at the unlocked position shown in FIG. 11(B) and to be turned to the locked position shown in FIG. 11(A) by being pushed by the rear striker 39. The striker engagement member 93 is spring-biased toward the unlocked position by a third torsion spring 98 which surrounds the third supporting shaft 97 and which is provided between the rear catch mechanism bracket 96 and the striker engagement member 93.

On an outer periphery of the striker engagement member 93, there are provided an engagement recess portion 99 capable of engaging with the rear striker 39 to receive the rear striker 39 when striker engagement member 93 is at the unlocked position, a fitting protruding portion 100 protruding outwardly and being adjacent to the engagement recess portion 99 in a circumferential direction to be capable of being pushed by the rear striker 39 inserted into the engagement recess portion 99 and a restriction protruding portion 101 protruding outwardly and toward an opposite side to the engagement recess portion 99 with respect to the third supporting shaft 97. The restriction protruding portion 101 comes into contact with a stopper 96a provided in the rear catch mechanism bracket 96 when the striker engagement member 93 is at the unlocked position, and holds the striker engagement member 93 at the unlocked position. Moreover, an outer peripheral surface of the fitting protruding portion 100 is formed in an arc shape along an imaginary circle about the axis of the third supporting shaft 97.

One end portion of the restriction member 94 is supported by a fourth supporting shaft 102 to be turnable between the restriction position shown in FIG. 11(A) and the restriction release position shown in FIG. 11(B). The fourth supporting shaft 102 includes an axis parallel to the third supporting shaft 97 and is provided on the rear catch mechanism bracket 96. The restriction member 94 is spring-biased toward the restriction position by a fourth torsion spring 103 which surrounds the fourth supporting shaft 102 and which is provided between the rear catch mechanism bracket 96 and the restriction member 94. The cable 46 is connected to another end portion of the restriction member 94 to pull the restriction member 94 toward the restriction release position upon the pulling-up operation of the operation lever 43.

On a surface of the restriction member 94 facing the striker engagement member 93, there are formed an arc-shaped contact surface 104 which comes into contact with an arc-shaped outer end portion of the fitting protruding portion 100 in the striker engagement member 93 when the restriction member 94 is at the restriction release position and a fitting recess portion 105 which is adjacent to the contact surface 104 and to which the fitting protruding portion 100 of the striker engagement member 93 is fitted when the restriction member 94 is at the restriction position. When the striker engagement member 93 is turned from the unlocked position to the locked position in a state where the restriction member 94 is at the restriction release position, the restriction member 94 is turned from the restriction release position to the restriction position with no pulling force from the cable 46 acting on the restriction member 94, and the fitting protruding portion 100 is fitted to the fitting recess portion 105, thereby maintaining the locked state of the striker restriction member 94.

Moreover, a restriction protruding portion 106 is provided on a surface of the restriction member 94 on an opposite side to the striker engagement member 93 to protrude, and comes into contact with a stopper 96b provided in the rear catch mechanism bracket 96 to restrict the turning of the restriction member 94 toward the restriction position at an end of the turning.

A linear alignment mark 107 is provided in the fitting protruding portion 100 of the striker engagement member 93 to determine the positions of the striker engagement member 93 and the restriction member 94 in a state where the restriction member 94 at the restriction position is engaged with the striker engagement member 93 at the locked position. A linear alignment mark 108 continuous with the alignment mark 107 when the restriction member 94 is at the restriction position is provided in the restriction member 94.

The paired lock plates 50, 50 in the switching operation means 42 are provided with turn prevention portions 50a, 50a which come into contact with the operation lever 43 biased toward the not-operated position and prevents the operation lever 43 from turning toward the not-operated position when the restriction member 77, 94 in contact with the striker engagement member 76, 93 at an intermediate position between the locked position and the unlocked position is at an intermediate position between the restriction position and the restriction release position.

Figure 12:
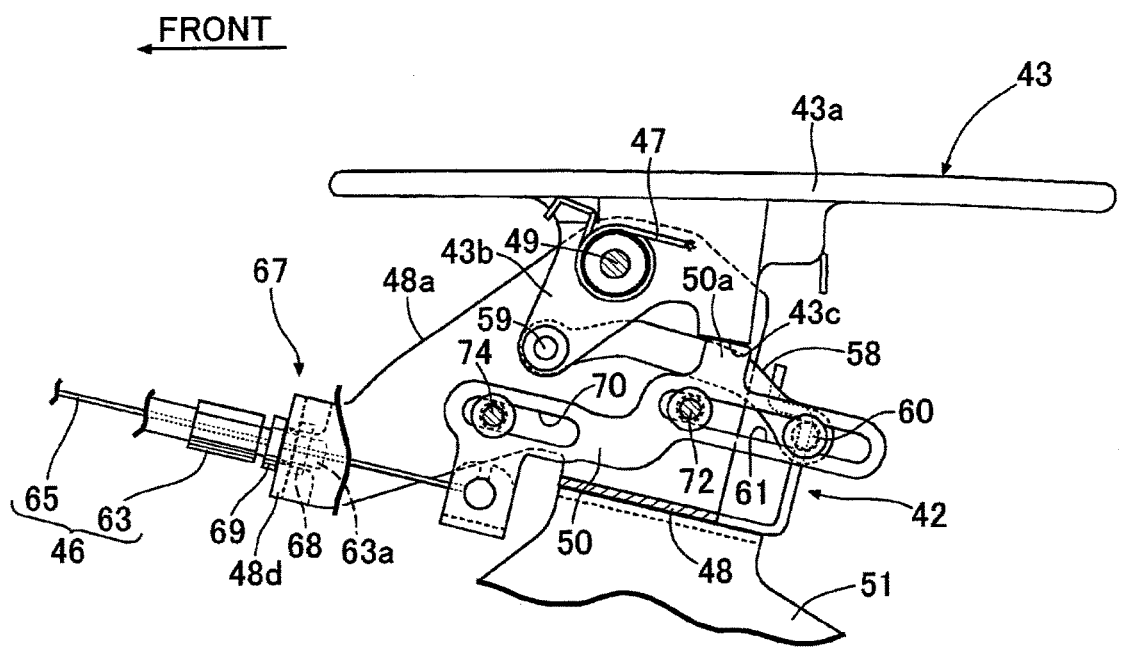
FIG. 12 is a cross-sectional view corresponding to FIG. 9 in which the switching operation means is in a lever locked state.

In other words, when at least one of the restriction members 77, 94 is at the intermediate position between the restriction position and the restriction release position, as shown in FIG. 12, the corresponding lock plate 50 is not moved forward to a position where the lock plate 50 is when the operation lever 43 is at the not-operated position. A contact portions 43c coming into contact with the turn prevention portion 50a of the lock plate 50 in this state from the operated position side is provided in each of the side plate portions 43b, 43b of the operation lever 43. The contact portions 43c do not come into contact with the turn prevention portions 50a in a state where the restriction members 77, 94 are at the restriction positions and the lock plates 50, 50 are moved forward to the positions corresponding to the not-operated state position of the operation lever 43, and allow the operation lever 43 to turn toward the not-operated position.

In addition, the lock plates 50, 50 are connected to the front catch mechanism 40 and the rear catch mechanism 41 via the independent cables 45, 46, and can be individually moved according to the operation states of the front catch mechanism 40 and the rear catch mechanism 41. Accordingly, the turning of the operation lever 43 toward the not-operated position is prevented when the locked state is incomplete in at least one of the front catch mechanism 40 and the rear catch mechanism 41.

Next, an action of the embodiment is described. Since the saddle bag 16 is formed to have the mountain-shaped bulging portion 44 bulging upwardly in the side view in the upper portion and the switching operation means 42 and the front and rear catch mechanisms 40, 41 disposed in the base portions 44a, 44b of the bulging portion 44 are connected to one another by the cables 45, 46 corresponding individually to the catch mechanisms 40, 41. Thus, it is possible to achieve a saddle bag shape extending along the shape of the rear portion of the motorcycle and increase the degree of freedom in design of the saddle bag 16. Furthermore, in order to efficiently support the lid 18 in the closed state in such a mountain-shaped saddle bag 16, it is desirable to dispose the front and rear catch mechanisms 40, 41 in the base portions 44a, 44b of the bulging portion 44. In this case, if a connecting rod which is a rigid body is used as in a conventional case, a dead space is formed and this does not lead to an increase in capacity. However, the configuration in which the switching operation means 42 is connected to the front and rear catch mechanisms 40, 41 via the cables 45, 46 corresponding individually to the catch mechanisms 40, 41 can make the dead space as small as possible and allows effective use of the capacity increase due to the bulging portion. In other words, it is possible to increase the degree of freedom in design of the saddle bag 16 and also increase the capacity thereof to make the saddle bag 16 more attractive as a product.

Moreover, the switching operation means 42 includes the bracket 48 which has the two plate-shaped supporting plate portions 48a and which is fixed to the bag base body 17, the operation lever 43 which is supported by the supporting plate portions 48a via the pivot 49 to be operable by being pulled upwardly in the case of switching the front and rear catch mechanisms 40, 41 from the locked state to the unlocked state, the multiple lock plates 50 which are individually connected to the cables 45, 46 and which are supported by the supporting plate portions 48a to move in the vehicle front-rear direction upon the pulling-up operation of the operation lever 43, and is disposed above the front and rear catch mechanisms 40, 41 at the position overlapping the upper portion of the bulging portion 44 in the side view. Accordingly, force in an up-down direction generated by the operation of the operation lever 43 from above the saddle bag 16 is converted into force in the vehicle front-rear directions to pull the cables 45, 46. This enables synchronous movement of the front and rear catch mechanisms 40, 41. Thus, the operability can be thus secured.

Furthermore, the front and rear catch mechanisms 40, 41 include the striker engagement members 76, 93 which are movable between the unlocked positions where the engagement start and disengagement of the front and rear strikers 38, 39 is enabled and the locked positions where the disengagement of the front and rear strikers 38, 39 is disabled and which are biased toward the unlocked positions and the restriction members 77, 94 which are movable between the restriction positions restricting the striker engagement members 76, 93 at the locked positions by engaging with the striker engagement members 76, 93 at the locked positions and the restriction release positions disengaged from the striker engagement members 76, 93 and which are biased toward the restriction positions. The cables 45, 46 are connected to the restriction members 77, 94 to pull the restriction members 77, 94 toward the restriction release positions upon a pulling-up operation of the operation lever 43. Accordingly, a force for switching the front and rear catch mechanisms 40, 41 from the locked state to the unlocked state can be effectively transmitted to the front and rear catch mechanisms 40, 41 by the cables 45, 46.

Moreover, each of the lock plates 50 is provided with the turn prevention portion 50a which comes into contact with the operation lever 43 biased toward the not-operated position and prevents the operation lever 43 from turning toward the not-operated position when the restriction member 77, 94 in contact with the striker engagement member 76, 93 at the intermediate position between the locked position and the unlocked position is at the intermediate position between the restriction position and the restriction release position. Accordingly, it is possible to easily know that at least one of the front and rear catch mechanisms 40, 41 is not in the completely locked state, from the operation lever 43 not returning to the not-operated position, without using a sensor or the like. Thus, the cost can be reduced.

Furthermore, the synchronization adjustment mechanisms 66, 67 are provided respectively on the end portions of the paired cables 45, 46 on the switching operation means 42 side, and the striker engagement members 76, 93. The restriction members 77, 94 of the front and rear catch mechanisms 40, 41 are provided with the alignment marks 90, 91; 107, 108 for determining the positions of the striker engagement members 76, 93 and the restriction members 77, 94 in the state where the restriction members 77, 94 at the restriction positions are engaged with the striker engagement members 76, 93 at the locked positions. Accordingly, the synchronization adjustment among the front and rear catch mechanisms 40, 41 and the operation lever 43 can be easily performed by using the synchronization adjustment mechanisms 66, 67 and the alignment marks 90, 91; 107, 108.

Moreover, the operation lever 43 has the flat plate-shaped operation plate portion 43a and is operable by pulling the rear portion of the operation plate portion 43a upwardly. The top surface of the operation plate portion 43a of the operation lever 43 at the not-operated position is disposed to be continuously flush with the top surface 22a, being inclined upwardly toward the front, of the upper side cover 22 forming part of the vehicle body cover C. The paired cables 45, 46 are connected to the front portions of the paired lock plates 50. Accordingly, an excellent exterior can be obtained. Moreover, since the operation can be performed by pulling the rear portion of the operation plate portion 43a upwardly, the operability can be improved.

Furthermore, the lid 18 is supported by the lower portion of the bag base body 17 via the hinges 26 to be openable outwardly in the vehicle width direction. The recess portions 27, 28, recessed rearwardly, are formed in the bag base body 17 and the front portion of the lid 18. The foot rest portion 31, on which the occupant places his/her foot is disposed, are formed in the recess portions 27, 28. Accordingly, it is possible to facilitate opening of the lid 18 and also secure the foot rest portion 31 for the occupant even when the lid 18 is closed.

Although the embodiment of the present invention has been described above, the present invention is not limited to the above embodiment. Various design changes can be made without departing from the present invention described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle bag lock device for a saddle-ride vehicle, comprising:
a plurality of strikers operatively provided on a lid openably and closably attached to each of bag base bodies fixed to left and right sides of a rear portion of a vehicle body, the lid forming a saddle bag together with the corresponding bag base body;
each of the bag base bodies is provided with a plurality of catch mechanisms switchable between a locked state in which the catch mechanisms are engaged with the strikers to lock the lid at a closed position and an unlocked state in which the catch mechanisms are disengaged from the strikers to allow opening of the lid;
switching operation means including a manually-operable operation member is provided on the vehicle body side, the switching operation means being manually-operable to synchronously switch the plurality of catch mechanisms from the locked state to the unlocked state;
wherein said saddle bag has a mountain-shaped bulging portion in an upper portion, the bulging portion bulging upwardly in a side view;
the switching operation means and the plurality of catch mechanisms disposed in base portions of the bulging portion are connected to one another by cables individually corresponding to each of the catch mechanisms;
said switching operation means includes a bracket having two plate-shaped supporting plate portions and being fixed to the bag base body, an operation lever, serving as the operation member, that is supported by the supporting plate portions via a pivot so as to be operable by being pulled upwardly in a pulling-up operation so as to switch the catch mechanisms from the locked state to the unlocked state and a plurality of lock plates being individually connected to each of the plurality of cables and being supported by the supporting plate portions to move in a vehicle front-rear direction according to the pulling-up operation of the operation lever;
said switching operation means is disposed above the plurality of catch mechanisms at a position overlapping an upper portion of the bulging portion in the side view;
each of the catch mechanisms includes a striker engagement member, which is movable between an unlocked position in which the start of engagement and disengagement of a corresponding one of the strikers is enabled and a locked position in which the disengagement of the corresponding striker is disabled, the striker engagement member is biased toward the unlocked position, and a restriction member, which is movable between a restriction position, restricting the striker engagement member at the locked position by engaging with the striker engagement member at the locked position, and a restriction release position, in which the restriction member is disengaged from the striker engagement member, and the restriction member is biased toward the restriction position; and the cables are connected to the restriction members such that the restriction members are pulled toward their respective restriction release positions upon the pulling-up operation of the operation lever;

wherein the operation lever is biased toward a not-operated position, each of the lock plates is provided with a turn prevention portion which comes into contact with the operation lever and prevents the operation lever from being turned toward the not-operated position by the bias when each restriction member is in contact with the corresponding striker engagement member when the striker engagement member is at an intermediate position between its locked position and its unlocked position, corresponding to an intermediate position of the restriction member between its restriction position and its restriction release position.

2. The saddle bag lock device for a saddle-ride vehicle according to claim 1, wherein:

a synchronization adjustment mechanism is provided in an end portion of each of the cables on the switching operation means side of each cable; and the striker engagement member and the restriction member of each of the plurality of catch mechanisms are provided, respectively, with alignment marks for determining positions of the striker engagement member and the restriction member in a state where the restriction member, at the restriction position, is engaged with the striker engagement member at the locked position.

3. The saddle bag lock device for a saddle-ride vehicle according to claim 1, wherein:

the operation lever has a flat plate-shaped operation plate portion and is operable by pulling upwardly a rear portion of the operation plate portion in a vehicle front-rear direction, and a top surface of the operation plate portion of the operation lever, when at the not-operated position, is disposed so as to be continuously flush with a top surface of a cover member forming part of a vehicle body cover, the top surface of the cover member being inclined upwardly toward a front; and the plurality of cables are connected to front portions of the plurality of lock plates in the vehicle front-rear direction.

4. The saddle bag lock device for a saddle-ride vehicle according to claim 1, wherein:

the lid is supported by a lower portion of the bag base body via a hinge to be openable outward in a vehicle width direction;

recess portions recessed rearwardly in a vehicle front-rear direction are formed in front portions of the bag base body and the lid in the vehicle front-rear direction; and a foot rest portion on which an occupant places his/her foot is disposed in the recess portions.

5. A saddle bag lock device for a saddle-ride vehicle, comprising:

bag base bodies fixed to left and right sides of a rear portion of a vehicle body;

a plurality of strikers operatively provided on a lid openably and closably attached to each of the bag base bodies, the lid forming a saddle bag together with the corresponding bag base body;

a plurality of catch mechanisms operatively connected to each of the bag base bodies, said plurality of catch mechanisms being switchable between a locked state in which the catch mechanisms are engaged with the strikers to lock the lid in a closed position and an unlocked state in which the catch mechanisms are disengaged from the strikers to allow opening of the lid;

a manually-operable operation member provided on the vehicle body side, said manually-operable operation member being connected to a switching operation means for manually operating the switching operation means to synchronously switch the plurality of catch mechanisms from the locked state to the unlocked state;

wherein said saddle bag has a mountain-shaped bulging portion in an upper portion, the bulging portion bulging upwardly in a side view;

the switching operation means and the plurality of catch mechanisms disposed in base portions of the bulging portion are connected to one another by cables individually corresponding to each of the catch mechanisms said switching operation means includes a bracket having two plate-shaped supporting plate portions and being fixed to the bag base body, an operation lever, serving as the operation member, that is supported by the supporting plate portions via a pivot so as to be operable by being pulled upwardly in a pulling-up operation so as to switch the catch mechanisms from the locked state to the unlocked state and a plurality of lock plates being individually connected to each of the plurality of cables and being supported by the supporting plate portions to move in a vehicle front-rear direction according to the pulling-up operation of the operation lever;

said switching operation means is disposed above the plurality of catch mechanisms at a position overlapping an upper portion of the bulging portion in the side view;

each of the catch mechanisms includes a striker engagement member, which is movable between an unlocked position in which the start of engagement and disengagement of a corresponding one of the strikers is enabled and a locked position in which the disengagement of the corresponding striker is disabled, the striker engagement member is biased toward the unlocked position, and a restriction member, which is movable between a restriction position, restricting the striker engagement member at the locked position by engaging with the striker engagement member at the locked position, and a restriction release position, in which the restriction member is disengaged from the striker engagement member, and the restriction member is biased toward the restriction position; and the cables are connected to the restriction members such that the restriction members are pulled toward their respective restriction release positions upon the pulling-up operation of the operation lever;

wherein the operation lever is biased toward a not-operated position, each of the lock plates is provided with a turn prevention portion which comes into contact with the operation lever and prevents the operation lever from being turned toward the not-operated position by the bias when each restriction member is in contact with the corresponding striker engagement member when the striker engagement member is at an intermediate position between its locked position and its unlocked position, corresponding to an intermediate position of the restriction member between its restriction position and its restriction release position.

6. The saddle bag lock device for a saddle-ride vehicle according to claim 5, wherein:

a synchronization adjustment mechanism is provided in an end portion of each of the cables on a switching operation means side of each cable; and the striker engagement member and the restriction member of each of the plurality of catch mechanisms are provided, respectively, with alignment marks for determining positions of the striker engagement member and the restriction member in a state where the restriction member, at the restriction position, is engaged with the striker engagement member at the locked position.

* * * * *